United States Patent
Mande et al.

(10) Patent No.: US 9,467,651 B2
(45) Date of Patent: *Oct. 11, 2016

(54) DETERMINING ELECTRONIC MEDIA FORMAT WHEN TRANSFERRING A CUSTOMER BETWEEN SPECIALISTS OR AMONGST COMMUNICATION SOURCES AT A CUSTOMER SERVICE OUTLET

(71) Applicant: BANK OF AMERICA CORPORATION, Charlotte, NC (US)

(72) Inventors: Christian Michael Mande, Charlotte, NC (US); James Robert Grimsley, Dover, FL (US); Tyler Johnson, Tega Cay, SC (US); Nathan Dent, Concord, NC (US); Sara Gill, New York, NY (US); Kristy M. Crist, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/041,926

(22) Filed: Feb. 11, 2016

(65) Prior Publication Data

US 2016/0165181 A1 Jun. 9, 2016

Related U.S. Application Data

(63) Continuation of application No. 14/461,131, filed on Aug. 15, 2014, now Pat. No. 9,264,667.

(51) Int. Cl.
*H04M 3/42* (2006.01)
*H04N 7/14* (2006.01)
*H04N 7/15* (2006.01)
*G06Q 30/00* (2012.01)

(52) U.S. Cl.
CPC ........... *H04N 7/147* (2013.01); *G06Q 30/016* (2013.01); *H04N 7/15* (2013.01)

(58) Field of Classification Search
CPC .................................. H04M 5/00; H04M 3/42
USPC ......... 348/14.01, 14.11; 379/212.01, 266.02, 379/265.09
See application file for complete search history.

(56) References Cited

U.S. PATENT DOCUMENTS

| | | | |
|---|---|---|---|
| 5,937,051 A * | 8/1999 | Hurd | H04M 3/5183 379/212.01 |
| 7,526,079 B2 * | 4/2009 | Mello | H04M 3/5183 379/212.01 |
| 7,814,016 B2 | 10/2010 | Pranger | |
| 7,857,207 B1 | 12/2010 | Hopkins, III | |
| 8,332,319 B2 | 12/2012 | Pranger | |
| 2006/0067507 A1 * | 3/2006 | Erhart | H04M 3/523 379/265.12 |

(Continued)

*Primary Examiner* — Olisa Anwah
(74) *Attorney, Agent, or Firm* — Michael A. Springs; Moore & Van Allen PLLC; W. Kevin Ransom

(57) ABSTRACT

Systems, apparatus, and computer program products are provided for determining the media format for transferring a customer from customer between specialists and/or from one communication source to another communication source within a customer service outlet, such as a banking center or the like. For example, while a two-way video conference system may be used for communication between a customer and a remote specialist, in certain instances in which the customer requires transfer to another specialist (e.g., a specialist having a different specialty) other media formats, such as one-way live video conference, live audio-only conference, text chat or the like may be implemented.

7 Claims, 12 Drawing Sheets

(56) References Cited

U.S. PATENT DOCUMENTS

| | | |
|---|---|---|
| 2013/0016173 A1 | 1/2013 | Johnson et al. |
| 2013/0018788 A1 | 1/2013 | Johnson et al. |
| 2013/0041797 A1 | 2/2013 | Geeslin et al. |
| 2013/0265432 A1 | 10/2013 | Freedman et al. |
| 2014/0014372 A1 | 1/2014 | Hay |
| 2014/0108557 A1 | 4/2014 | Calman et al. |
| 2014/0344169 A1* | 11/2014 | Phelps ............ G06Q 30/016 705/304 |

* cited by examiner

DETERMINING ELECTRONIC MEDIA FORMAT WHEN TRANSFERRING A CUSTOMER BETWEEN SPECIALISTS OR AMONGST COMMUNICATION SOURCES AT A CUSTOMER SERVICE OUTLET

CROSS-REFERENCE TO RELATED APPLICATIONS

This application is a continuation of U.S. patent application Ser. No. 14/461,131, filed Aug. 15, 2014; the contents of which are hereby incorporated by reference.

FIELD

In general, embodiments of the invention relate to communication services and, more particularly, determining the form of electronic media to implement when transferring a customer between specialists and/or from one communication source to another communication source within a customer service outlet, such as a banking center or the like.

BACKGROUND

Customers of businesses, such as financial institutions or the like, that have many customer service outlets, otherwise referred to as centers, branches or the like, have come to expect that when they visit any of the service outlets, the service outlet will have the immediate capability to address their particular special needs or services. However, as businesses such as financial institutions streamline their operations for the sake of efficiency, they have come to realize that round-the-clock location of specialists at each service outlet/center is inefficient. For example, in the financial institution setting, if each banking center employs at least one full-time mortgage/loan specialist, a full-time small business specialist and/or a full-time personal financial advisor/specialist, the specialist may only be called upon in regards to their specialty in the event a customer visits the banking center requiring assistance in the area of specialty.

Certain businesses, such as financial institutions and the like, have addressed the problem associated with staffing service outlets with full-time specialists by implementing video conferencing systems. Specifically, such video conferencing systems may employ two-way video conferencing communication between a customer, who is located at the service outlet/banking center, and a specialist, who is located remote from the service outlet/center, such that both customer and specialist receive audio and video feeds of the other participant. Alternatively, a one-way video conferencing system provides the customer a video and audio feed of a remote specialist, while the remote specialist is limited to receiving an audio feed from the customer. Such video conferencing systems are set-up in private settings within the business to provide the customer assurance that the information exchanged during the communication session is held in private. In this regard, a customer service outlet/center equipped with video conferencing communication can provide customers on-demand access to specialists having different areas of specialty/expertise without requiring the full-time physical presence of the specialist at the business outlet/center.

In certain instances, it becomes apparent that a customer that is participating in a video conferencing communication session or any other media-based communication requires further assistance, such as from another specialist, either another specialist of the same specialty or another specialist of a different specialty (i.e., a different line-of-business or the like). Additionally, the further assistance that may be required may be some form of self-service assistance, in which the customer need not rely on communication with another business associate or specialist. In such instances, the further assistance may require the customer to transfer from one communication source to another source (e.g., from a video communication mechanism to a tablet device, personal computer device or the like.)

Currently, in the video conferencing environment the options for transferring/transitioning the customer are rather limited; either the specialist that is communicating with the customer can provide the customer a referral (i.e., provide the name of a an associate/specialist who may or may not be located at the banking center where the customer is currently located), or the specialist can instruct the customer to exit the current video conference communication session and, subsequently re-dial or initiate a new video conference communication session with the other specialist. However, both options result in ineffective customer service. Both the referral process and the initiation of a new video conference communication session create undesirable time delay and efficiencies in the communication between the customer and the business. Such time delay is not only burdensome to the customer but, from the business perspective, also poses a serious threat to lost business opportunities. From the inefficiency perspective, since both the referral process and the initiation of a new video conference communication session result in a communication disconnect, any information shared with the initial specialist, private or otherwise, is not readily susceptible to being shared or otherwise available to the subsequent specialist.

Moreover, when transferring a customer between specialists or amongst different communication platforms the business may want to insure that the customer's needs are met and/or that the cost-effective source of communication is used upon transfer.

Therefore, a need exists to develop systems, apparatus, methods, computer program products and the like that provide for assisting in the seamless transfer of a customer when transitioning between specialists and/or amongst different communication sources. The desired aspects should alleviate problems related to disconnects and/or time delays associated with a customer requiring communication with another specialist and/or communication source/mechanism. In addition, the desired systems, apparatus, methods, computer program products and the like should allow for customer information, private or otherwise, to be readily shared amongst specialists so as to eliminate the need of the customer to communicate information to a subsequent specialist that was previously communicated to the first specialist. Moreover, the desired aspects should address the need to determine, and provide, the level of service (i.e., the appropriate specialist and/or appropriate communication source) required by the customer when communicating with the subsequent on-site business knowledge source (i.e., specialist, communication source, business application or the like), so as to meet the expectations of the customer while balancing cost effectiveness on behalf of the business.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, methods, computer program products or the like for determining the electronic media format when transferring a customer from business knowledge source to another business knowledge source (e.g., specialist-to-specialist, application-to-specialist, specialist-to-application, and the like). The electronic media format that is provided to the customer may include two-way live video conference, one-way live video conference, live audio-only conference, text chat, pre-recorded video, pre-recorded audio, online/network content/presentations and the like. The determination of which electronic media format to provide to the customer may be based on business rules, which take into account one or more of (a) the reason for the transfer, (b) the status/profile of the customer, (c) predicted duration of the transferred communication and the like. Moreover, the determination may be based on the electronic media formats supported by the specialist and/or the entity/line-of-business (LOB).

A system for selecting the media format when transferring a customer between business knowledge sources (communication sources/mechanisms or applications/platforms) at a customer service outlet defines first embodiments of the invention. The system includes an apparatus located within a business location. The apparatus includes a computing platform having a memory, a processor, and at least one of a display, a video camera, a speaker and a microphone, all of which are in communication with a processor device. The apparatus is configured to implement one or more of the display, the video camera and the speaker and the microphone to provide a customer a communication platform for conducting a media-based communication session with a specialist located remote from the business location.

The system further includes a customer transferring module stored in a memory and executable by a processor. The customer transferring module is configured to receive a request to transfer a customer from a first specialist to a second specialist during the communication session, and, in response to receiving the request, apply at least one business rule to determine a media format to implement for communication between the customer and the second specialist. The media format may be one of two-way video conference, one-way video conference, audio-only or text chat. Additionally, the module is configured to initiate, during the ongoing communication session, transfer of the customer from the first specialist to the second specialist using the determined media format.

In specific embodiments of the system, the customer transferring module is further configured to apply the business rule to determine the media format, wherein the business rule that is applied provides for choosing the media format based on one or more of business status of the customer, customer profile information or historical interactions with the customer. In other related embodiments of the system, the business rule that is applied provides for choosing the media format based on one or more of a specialty of the second specialist or a predicted duration of the transferred communication. In a specific embodiment of the system, the business rule that is applied provides for prioritizing selection of video communication as the media format based on availability of video communication from an entity associated with the second specialist. In a still further embodiment of the system, the business rule that is applied provides selecting the media format based on a shortest queue time for transferring to the second specialist.

In a further specific embodiment of the system, the customer transferring module is further configured to seamlessly initiate transfer of the customer from the first specialist to the second specialist using video conferencing communication as the determined media format. In such embodiments of the system, the module may be further configured to present, in a transfer mode, a dual screen display of a first video stream of the first specialist and a second video stream of the second specialist, such that the two specialists are visible in the display up until the point where the first specialist hands-off the communication session to the second specialist.

A method for selecting the media format when transferring a customer between business knowledge sources (communication sources/mechanisms or applications/platforms) at a customer service outlet defines second embodiments of the invention. The method includes receiving a request to transfer a customer from a first specialist to a second specialist during a media-based communication session and, in response to receiving the request, determining a media format to implement for communication between the customer and the second specialist based on application of one or more business rules. The method further includes seamlessly initiating, during the communication session, transfer of the customer from the first specialist to the second specialist using the determined media format. The media format that is selected may one of two-way video communication, one-way video communication, audio-only communication or text chat communication.

In specific embodiments of the method, determining the media format further includes determining a media format to implement for communication between the customer and the second specialist based on application of one or more business rules. In such embodiments of the method, the business rule that is applied provides for choosing the media format based on one or more of business status of the customer, customer profile information or historical interactions with the customer. In other related embodiments of the method, the business rule that is applied provides for choosing the media format based on a specialty of the second specialist and/or the predicted duration of the transferred communication session. In one specific embodiment of the method, the business rule that is applied provides for prioritizing selection of video communication as the media format based on availability of video communication from an entity associated with the second specialist. In yet another specific embodiment of the method, the business rule that is applied provides selecting the media format based on a shortest queue time for transferring to the second specialist.

In specific embodiments of the method, determining the media format further includes determining video communication as the media format. In such embodiments the method further includes presenting, in a transfer mode, a dual screen display of a first video stream of the first specialist and a second video stream of the second specialist.

A computer program product including a non-transitory computer-readable medium defines third embodiments of the invention. The computer-readable medium includes a first set of codes for causing a computer to receive a request to transfer a customer from a first specialist to a second specialist during a media-based communication session. The computer-readable medium additionally includes a second set of codes for causing a computer to, in response to receiving the request, determine a media format to implement for communication between the customer and the second specialist based on application of one or more business rules. In addition, the computer-readable medium includes a third set of codes for causing a computer to, during the communication session, seamlessly initiate transfer of the customer from the first specialist to the second specialist using the determined media format.

Thus, systems, apparatus, methods, and computer program products herein described in detail below provide for determining the electronic media format for transferring a customer between specialists and/or amongst different communication sources (i.e., applications or devices/mechanisms) within a customer service outlet, such as a banking center or the like. For example, while a two-way video conference system may be used for communication between a customer and a remote specialist, in certain instances in which the customer requires transfer to another specialist (e.g., a specialist having a different specialty) other media formats, such as one-way live video conference, live audio-only conference, text chat or the like may be implemented. Alternatively, in other instances in which the customer requires transition to a self-service application (e.g., an application that does not require live interaction with an associate/specialist) other media formats such as pre-recorded video or audio, online/network content/presentations may suffice, which may dictate a transfer in communication sources (i.e., transferring to an onsite tablet device, PC or the like). The need to determine a change in electronic media format upon transferring/transitioning between business knowledge sources may be based on media format availability and may take into account business rules that are based on cost effectiveness and the like. The business rules may take into account various factors, such as, but not limited to, the reason for the transfer (e.g., the type of specialist, the type of application required), the status of the customer, the profile/preferences of the customer, the historical interactions with the customer and the like. Additionally, other factors may influence the determination of the electronic media format, for example, the predicted duration of the transferred communication, the capabilities of the specialist or application, the current queue times and the like.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
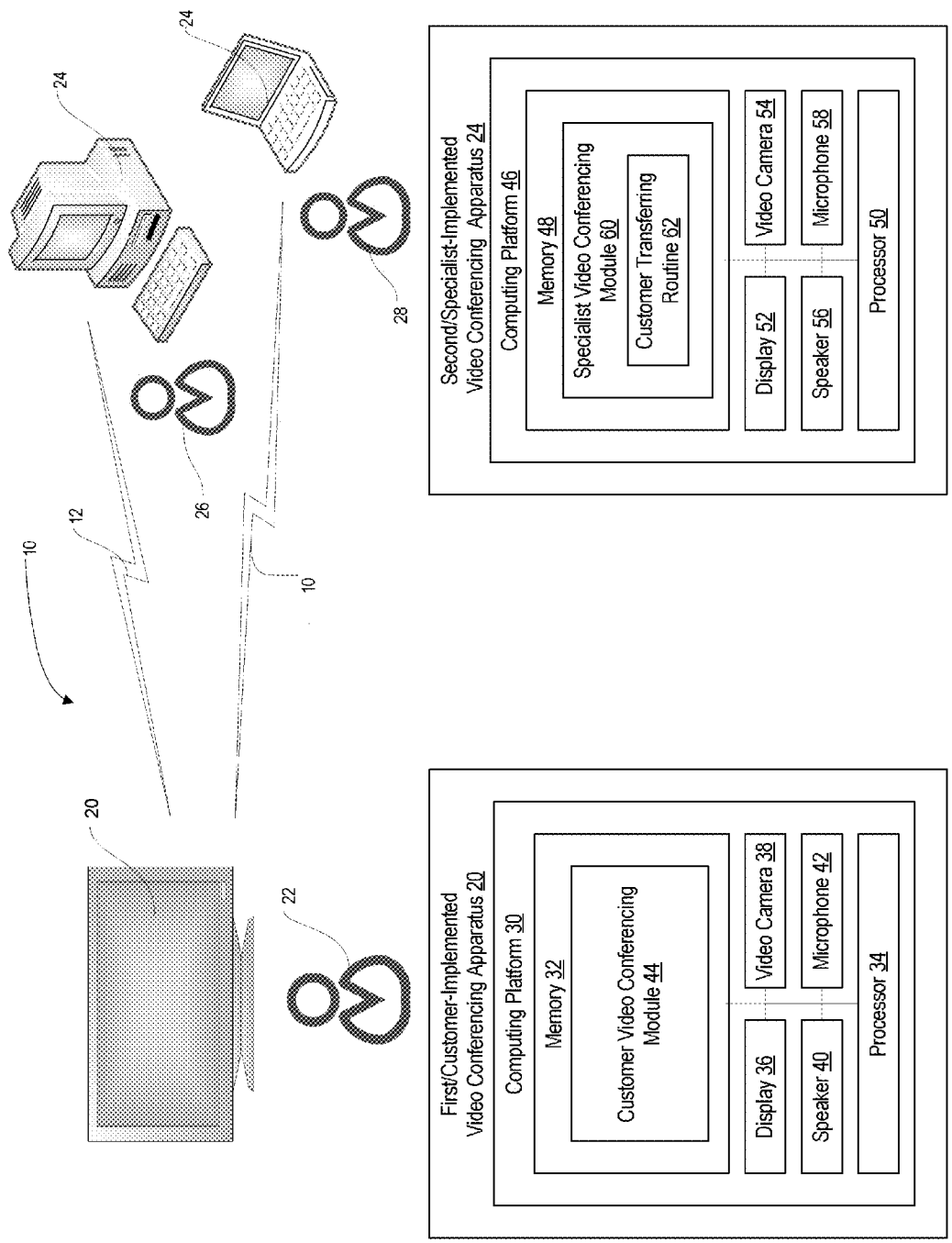
Figure 2:
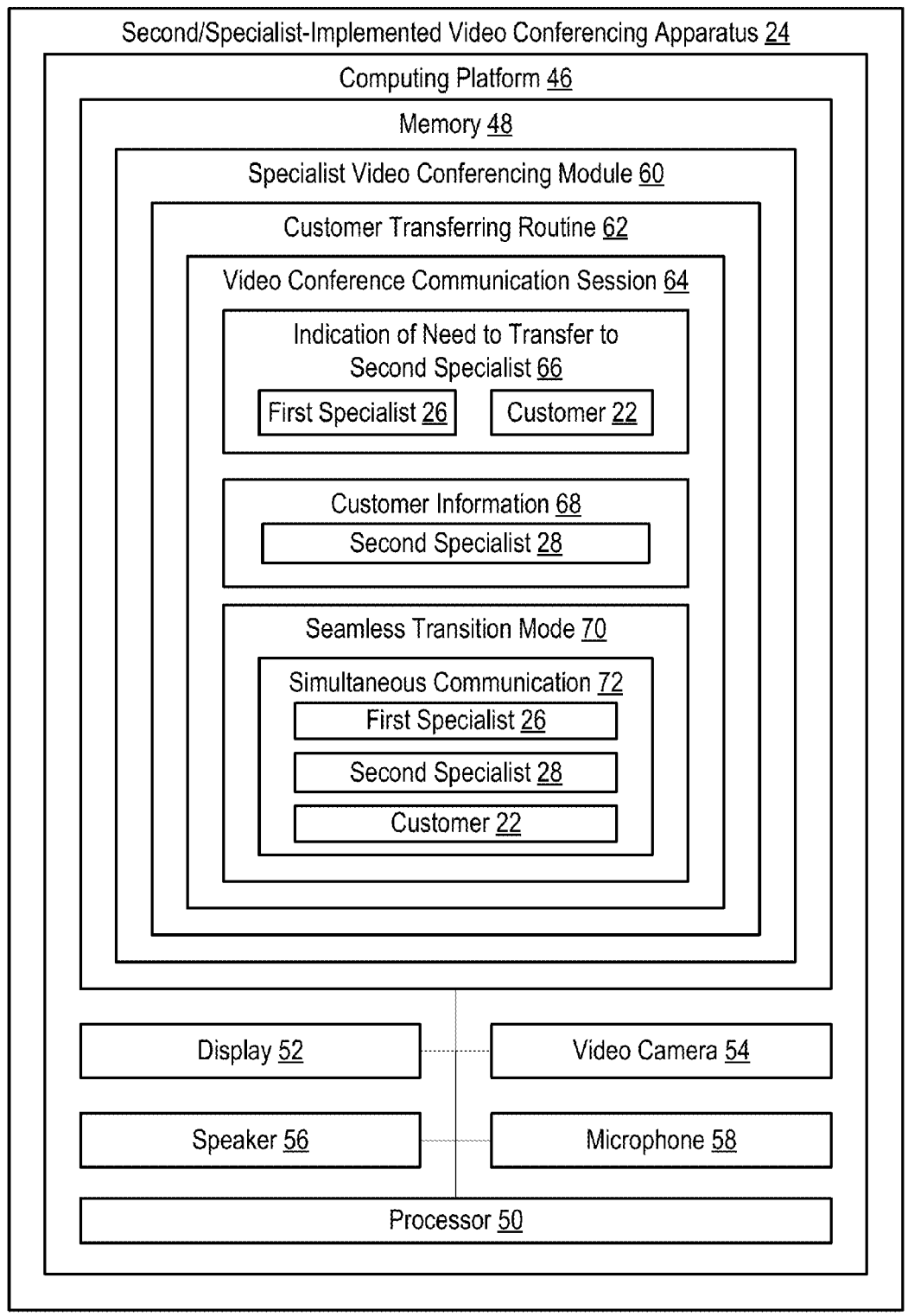
Figure 3:
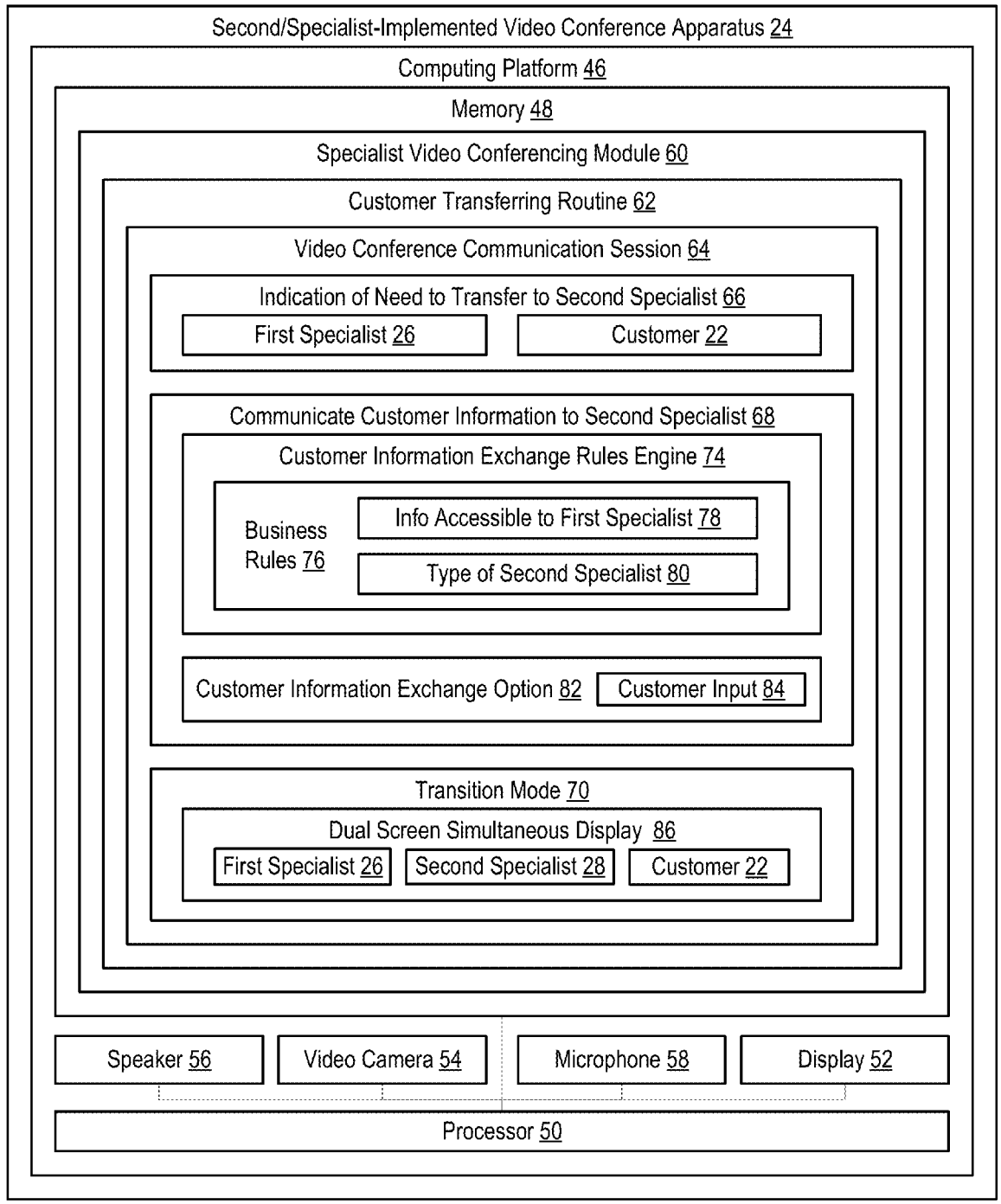
Figure 4:
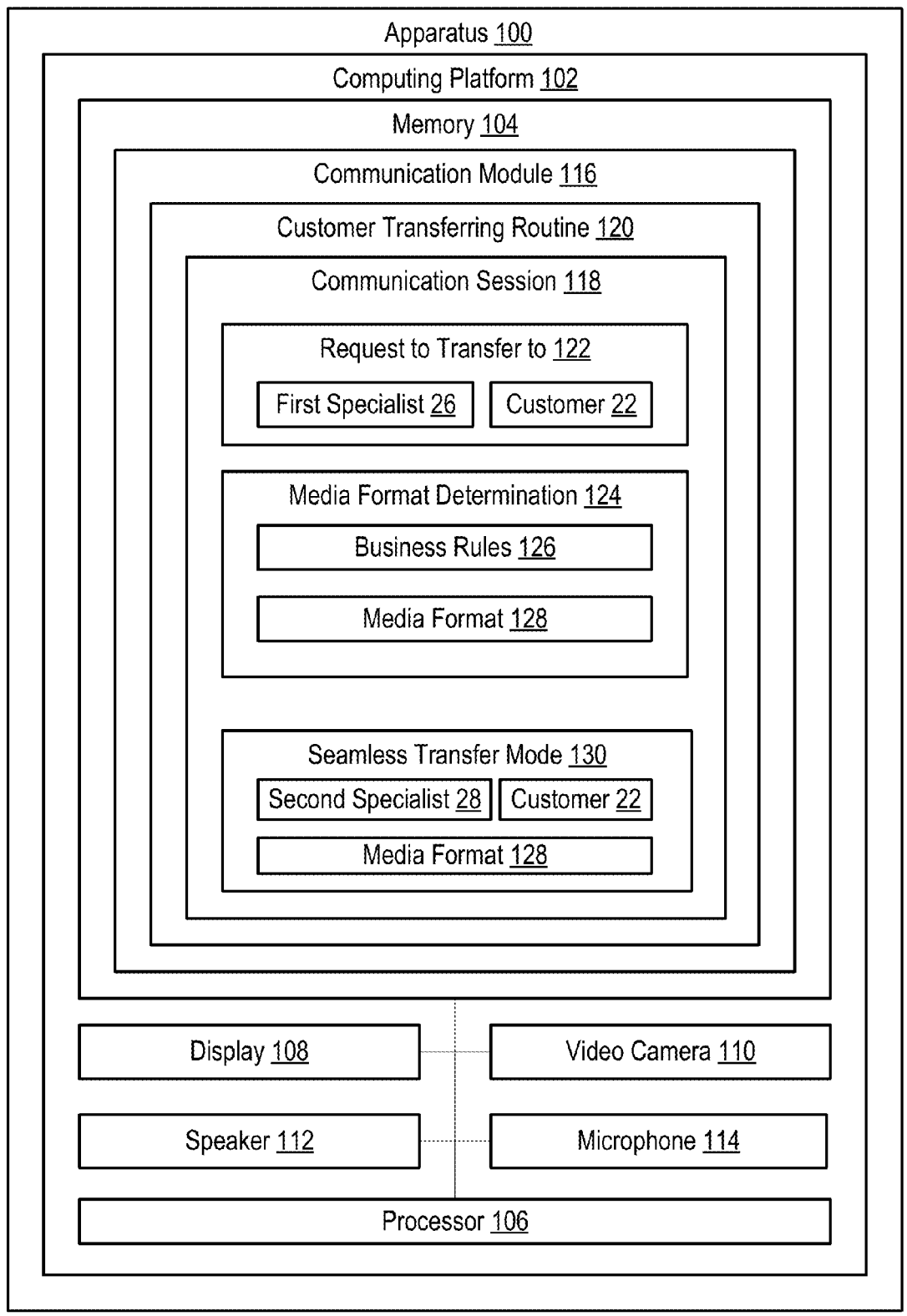
Figure 5:
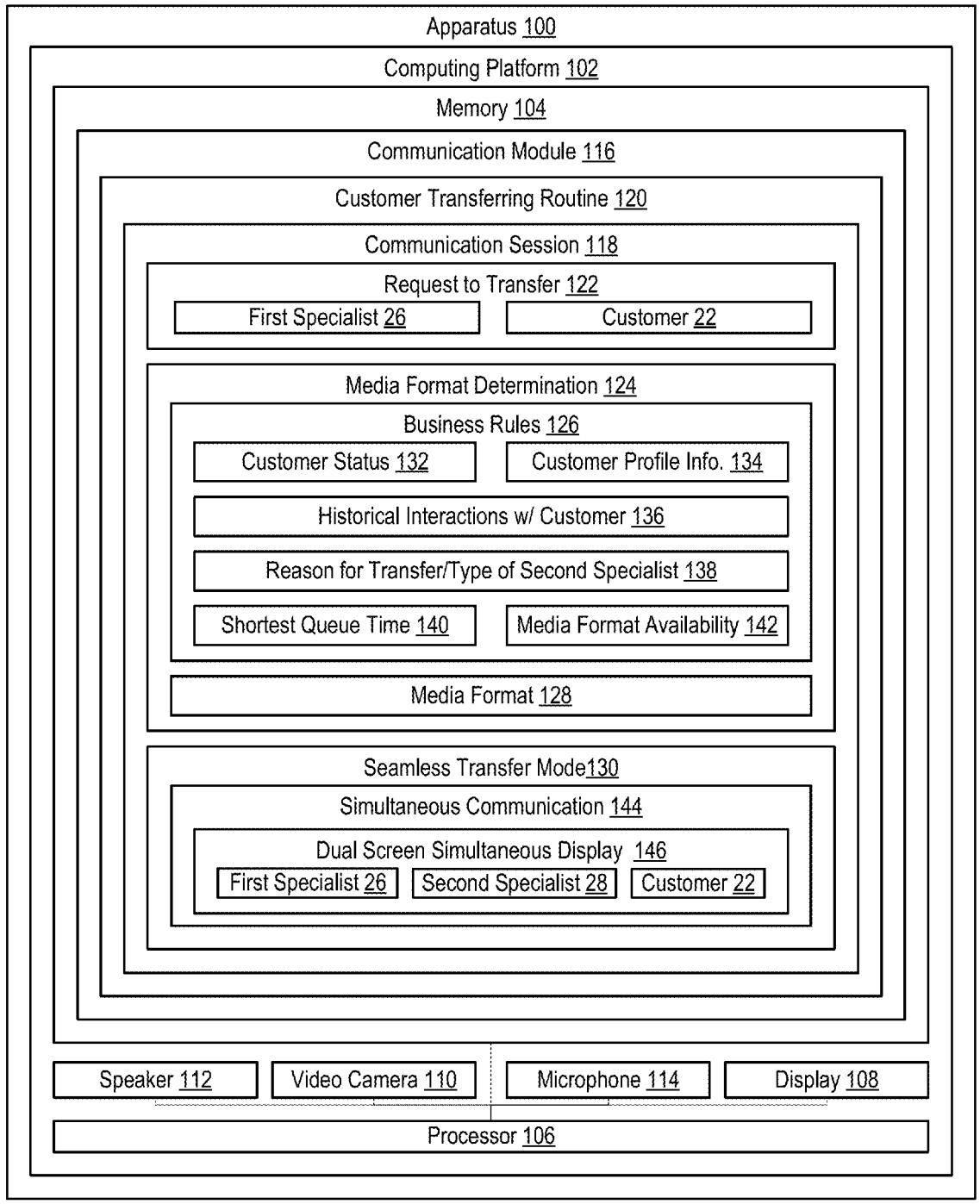
Figure 6:
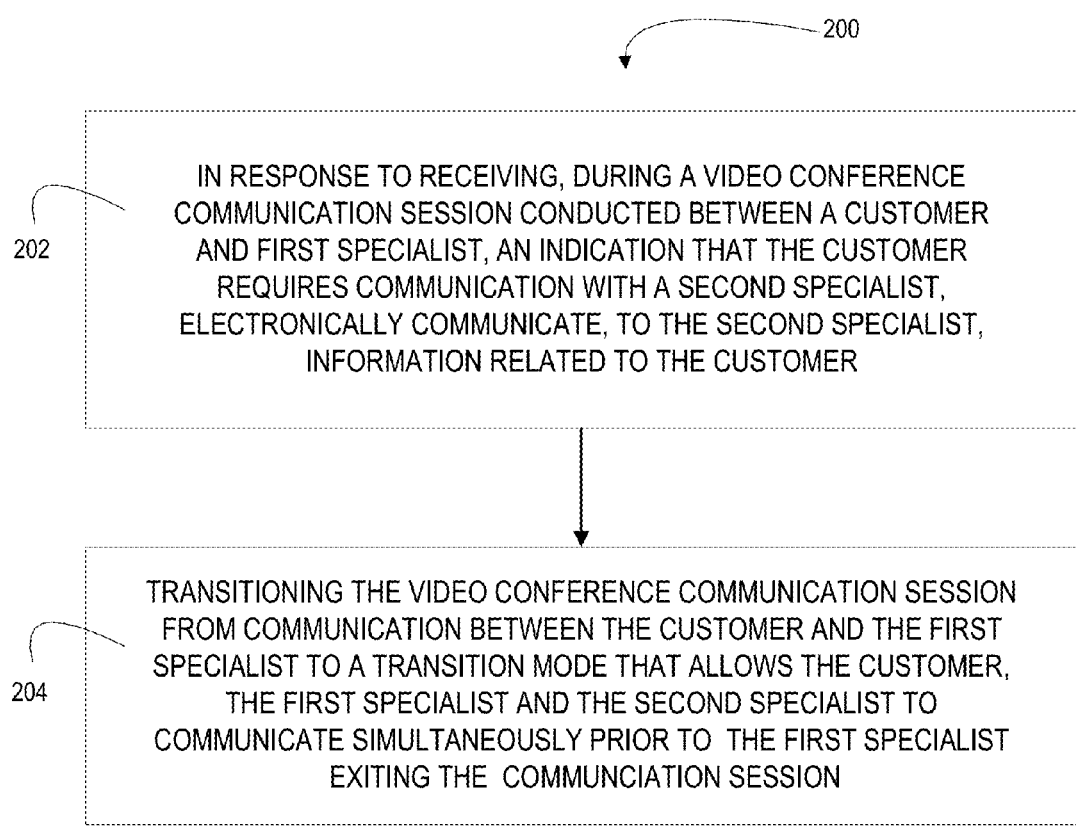
Figure 7:
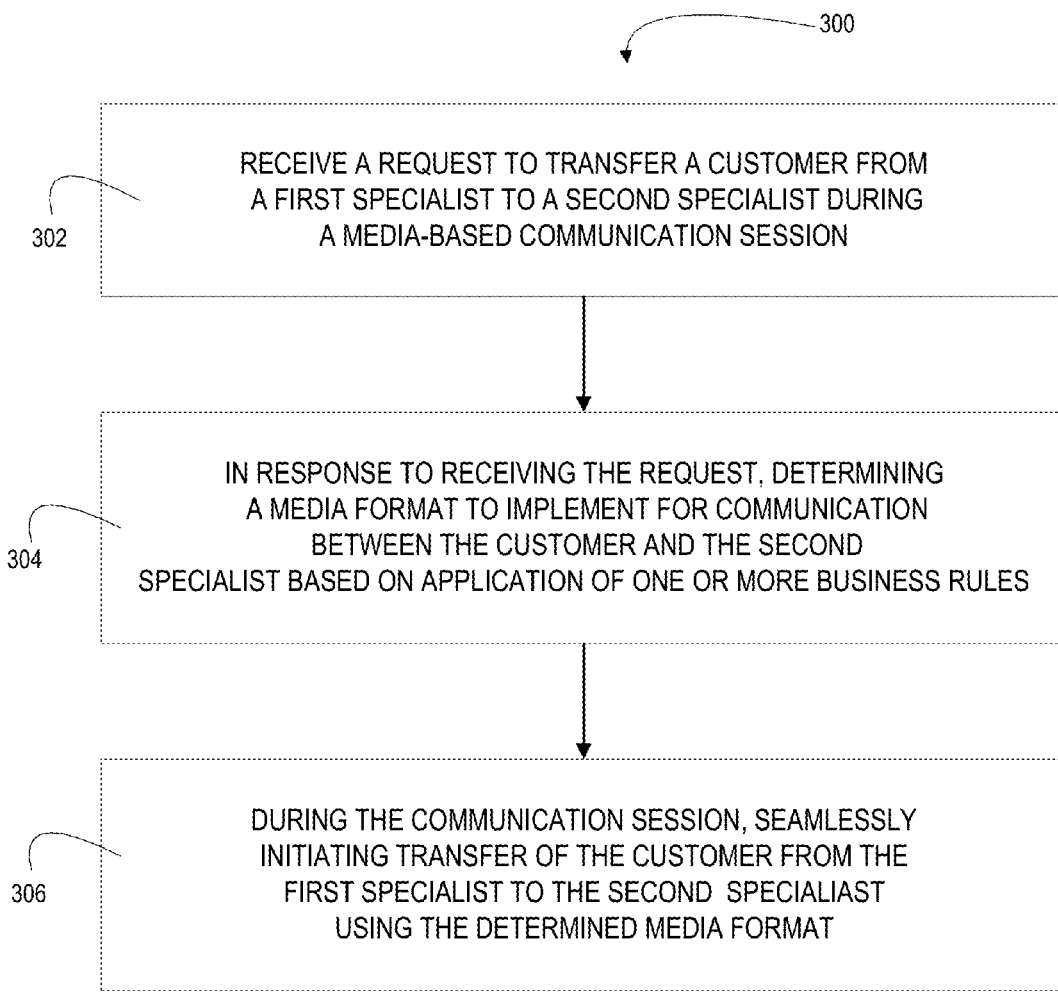
Figure 8:
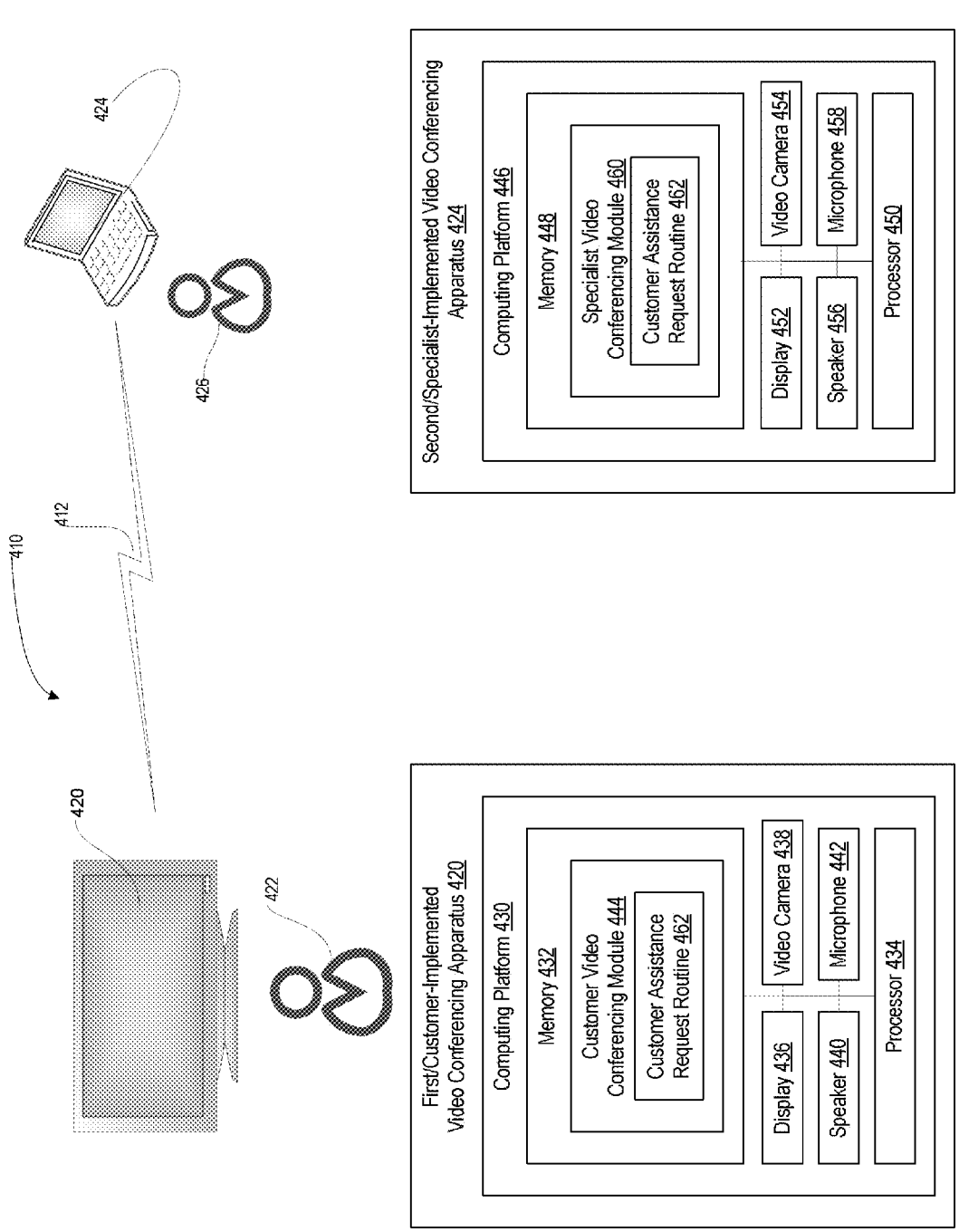
Figure 9:
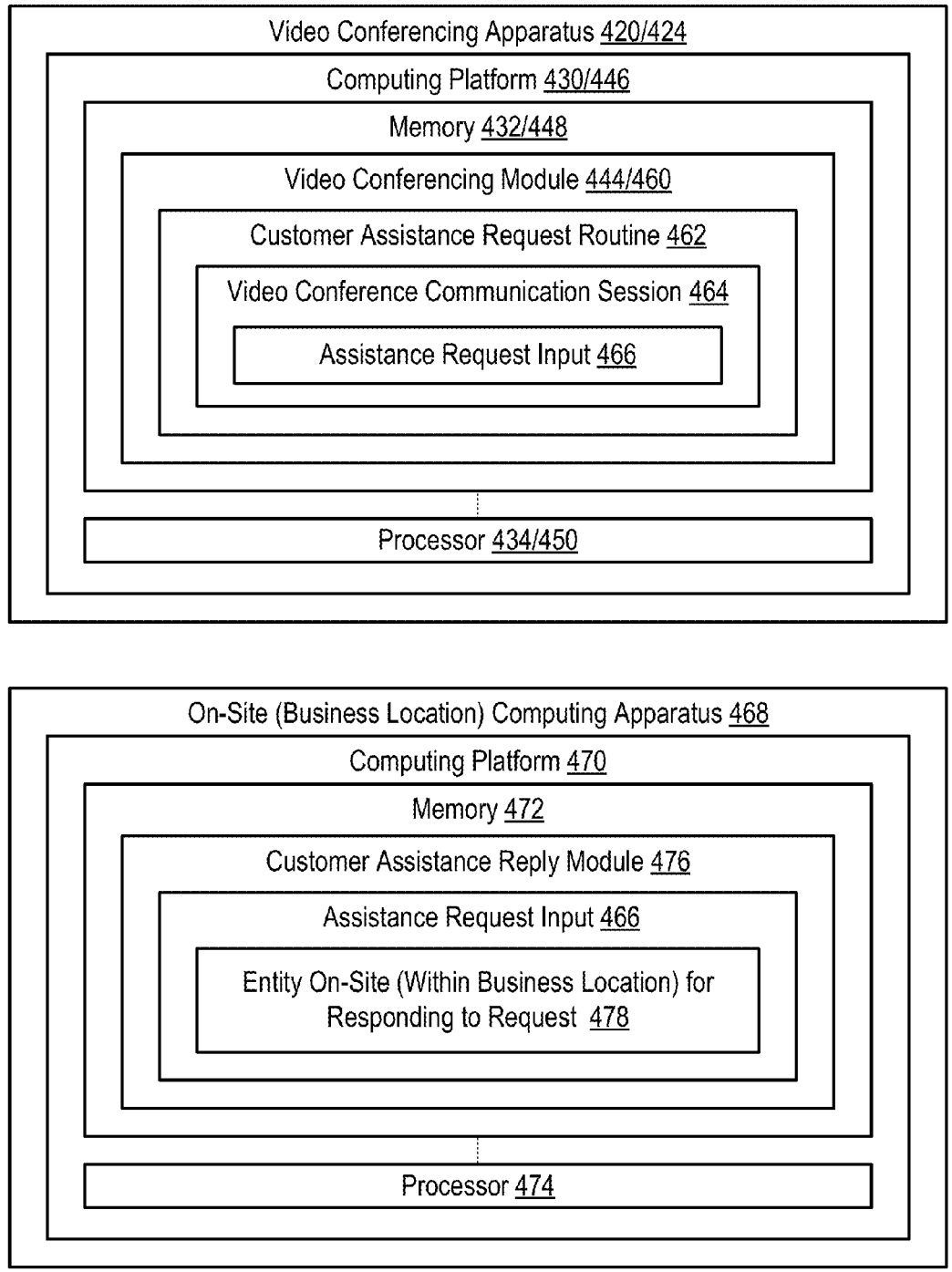
Figure 10:
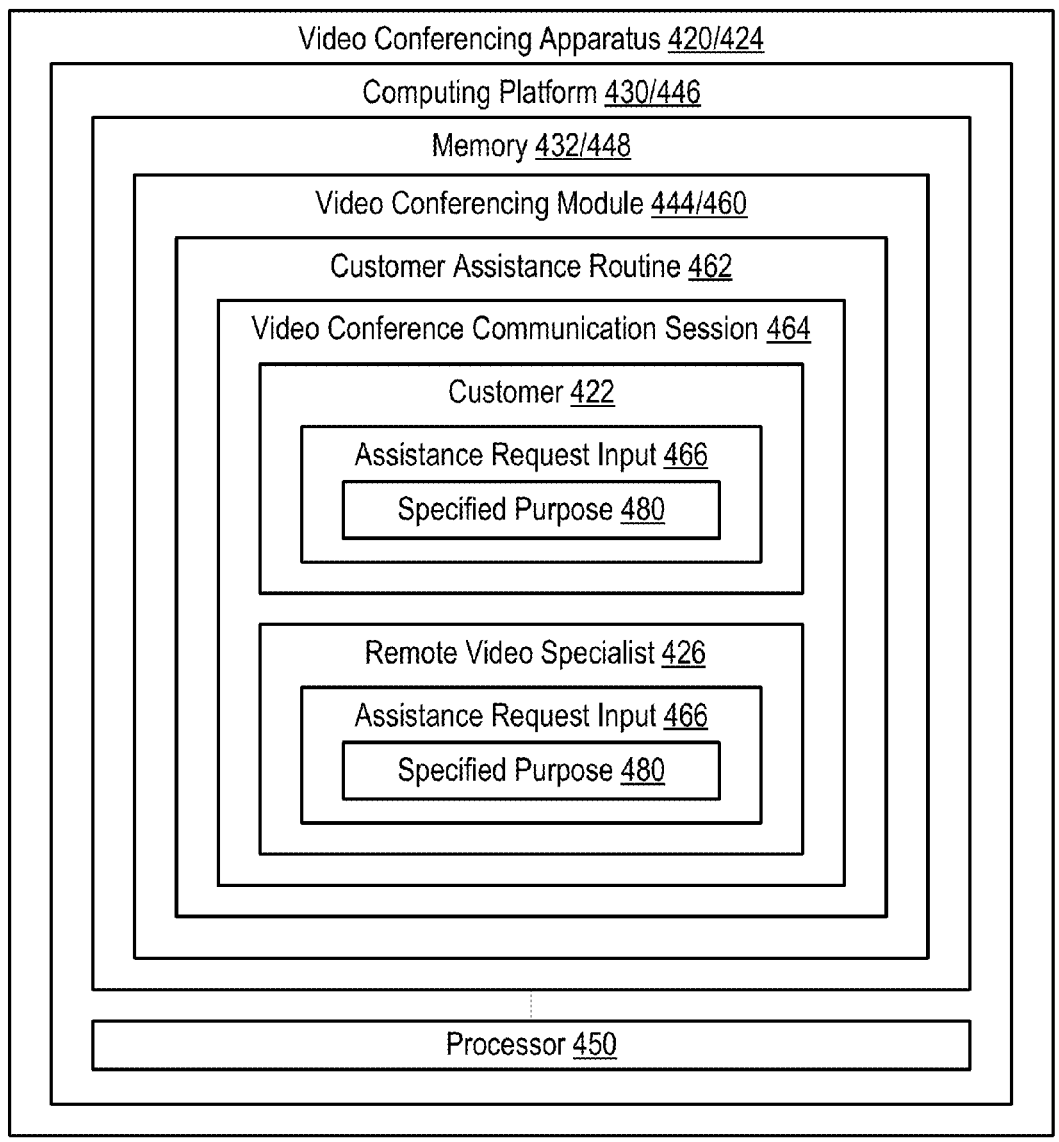
Figure 11:
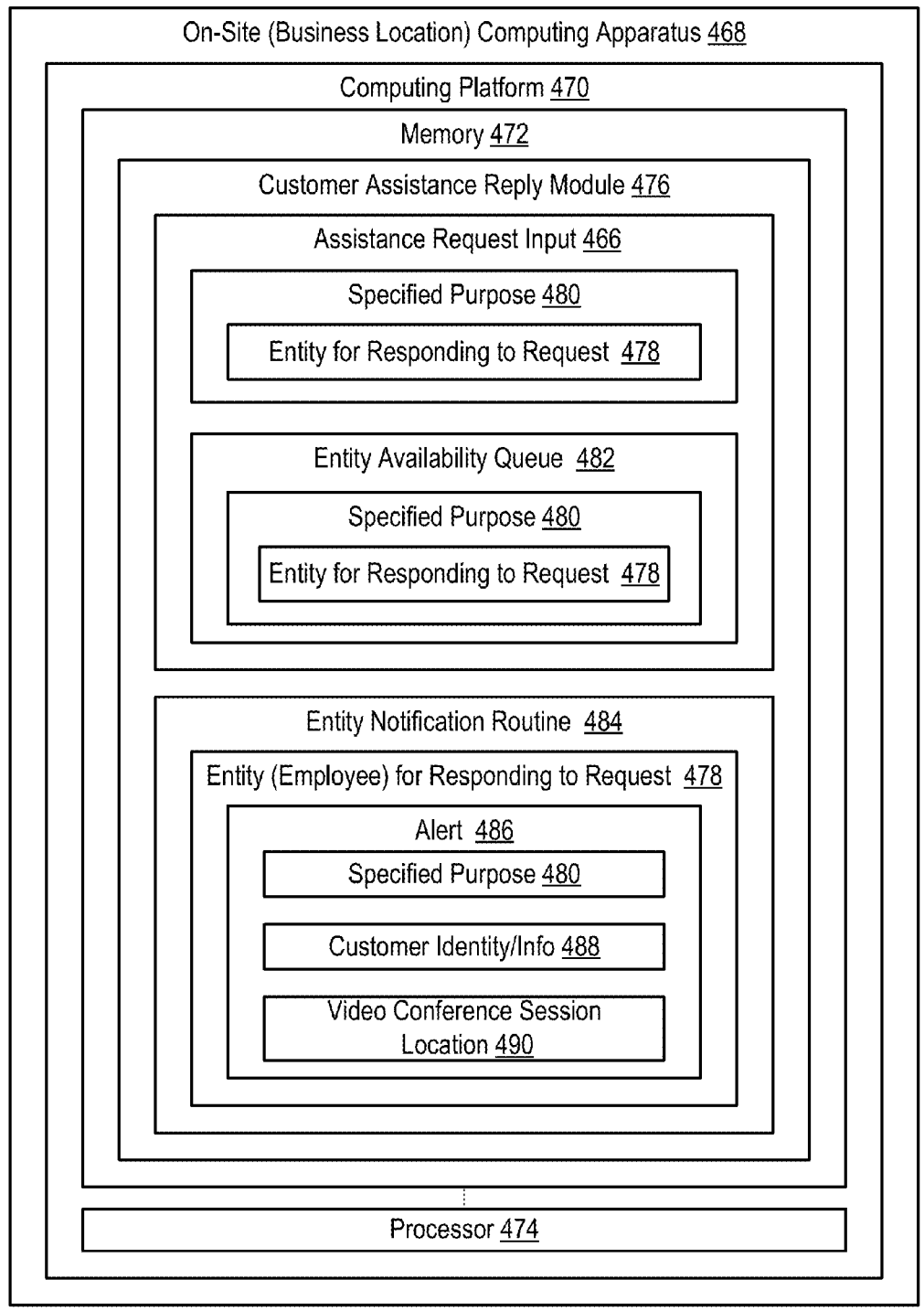
Figure 12:
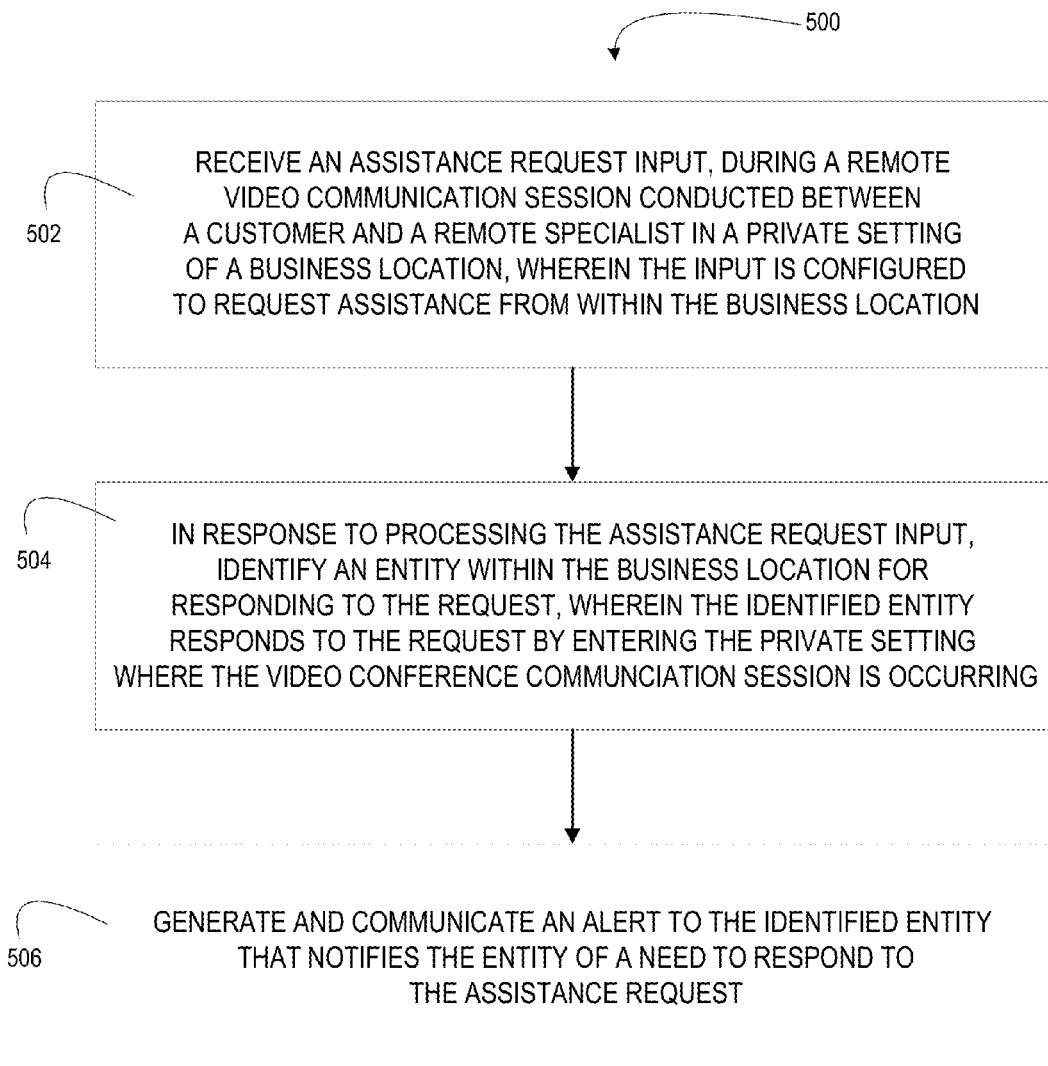

Having thus described embodiments of the invention in general terms, reference will now be made to the accompanying drawings, which are not necessarily drawn to scale, and wherein:

FIG. 1 provides a schematic and block diagram of a system configured for seamless customer transfer from one video conference specialist to another video conference specialist, in accordance with embodiments of the present invention;

FIG. 2 provides a block diagram of a video conferencing apparatus configured for seamless customer transfer, in accordance with embodiments of the present invention;

FIG. 3 provides a more detailed block diagram of a video conferencing apparatus configured for seamless customer transfer, in accordance with present embodiments of the invention;

FIG. 4 provides a block diagram of an apparatus configured for media format determination when transferring a customer from one specialist to another specialist, in accordance with embodiments of the present invention;

FIG. 5 provides a more detailed block diagram of an apparatus configured for media format determination when transferring a customer from one specialist to another specialist, in accordance with embodiments of the present invention;

FIG. 6 provides a flow diagram of a method for seamless customer transfer from one specialist to another specialist during an ongoing video conferencing communication session, in accordance with embodiments of the present invention;

FIG. 7 provides a flow diagram of a method for media format determination when transferring a customer from one specialist to another specialist, in accordance with embodiments of the present invention;

FIG. 8 provides a schematic and block diagram of a system configured for requesting onsite assistance while conducting an ongoing video conferencing communication session, in accordance with embodiments of the present invention;

FIG. 9 provides a block diagram of a system for request onsite assistance while conducting an ongoing video conferencing communication session and responding to the request, in accordance with embodiments of the present invention;

FIG. 10 provides a more detailed block diagram of an apparatus configured for receiving assistance requests during an ongoing video conferencing communication session, in accordance with present embodiments of the invention;

FIG. 11 provides a more detailed block diagram of an onsite computing device configured for processing assistance requests to identity an entity for responding to the assistance request during an ongoing video conferencing communication session, in accordance with present embodiments of the invention; and FIG. 12 provides a flow diagram of a method for providing a customer automated onsite assistance when using a video conferencing system, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for determining the electronic media format for transferring/transitioning a customer between specialists and/or amongst different communication sources (i.e., applications or devices/mechanisms) within a customer service outlet, such as a banking center or the like. For example, while a two-way video conference system may be used for communication between a customer and a remote specialist, in certain instances in which the customer requires transfer to another specialist (e.g., a specialist having a different specialty) other media formats, such as one-way live video conference, live audio-only conferencing, text chat or the like may be implemented. In a further example, in which the customer requires transition to a self-service application (i.e., an application that does not require live interaction with an associate/specialist) other media formats such as pre-recorded video or audio, online/network content/presentations may suffice and may require transfer to a different communication source. The need to determine a change in electronic media format upon transferring/transitioning a customer between specialists and/or communication sources may be based on media format availability and may take into account cost effectiveness and customer experience.

The determination of which electronic media format should be used for the transferred communication may be based upon business rules that may take into account various factors, such as, but not limited to, the reason for the transfer (i.e., the type of specialist, the type information required or the like), the status of the customer, the profile/preferences of the customer, the historical interactions with the customer and the like. Additionally, other factors may influence the determination of the electronic media format, for example, the predicted duration of the transferred communication, the capabilities of the specialist or the application, the current queue times and the like.

Seamless Customer Transfer in a Video Conference System

Referring to FIG. 1, a combination schematic and block diagram is presented of a system 10 for seamless customer transfer from one video conference specialist to another video conference specialist during an ongoing video conference communication session, in accordance with an embodiment of the invention. The system 10 includes a first or customer-implemented video conferencing apparatus 20 that is located within a private setting in a business location, such that the customer 22 can communicate and exchange private information with a specialist through designated communication devices. In one specific example, the first video conference apparatus 20 may be located within an enclosed space at a financial institution, such as a banking center. The customer-implemented video conferencing apparatus 20 includes a computing platform 30 having a memory 32 and a processor 34 in communication with memory 32. In addition, first video conferencing apparatus 20 includes a display 36, a video camera 38, a speaker 40 and a microphone 42, all of which are in communication with the processor 34 and may be embodied in hardware and/or software. The video conferencing apparatus 20 may include more than one device, such as dedicated, stationary video conferencing devices or the video conferencing apparatus 20 may be a single device, such as a mobile device (i.e., computing tablet or the like). The memory 32 of video conferencing apparatus 20 stores customer video conferencing module 44 that is configured to implement the display 36, the video camera 38, the speaker 40 and the microphone 42 to conduct a video (and audio) communication session (i.e., a video chat session) with a specialist that is located physically remote from the business location at which the first/customer-implemented video conferencing apparatus 20 is located.

The first video-conferencing apparatus 20 is in network 12 communication (wired, wireless or a combination thereof) with a second or specialist-implemented video conferencing apparatus 24. Second video conferencing apparatus 24 may be any communication device that facilitates audio and video communication, such as personal computer (PC), laptop computer, mobile computing device (e.g., tablet device, mobile/cellular telephone) or the like. The specialist-implemented video conferencing apparatus 24 includes a computing platform 46 having a memory 48 and a processor 50 in communication with memory 48. In addition, second video conferencing apparatus 24 includes a display 52, a video camera 54, a speaker 56 and a microphone 58, all of which are in communication with the processor 50 and may be embodied in hardware and/or software. The memory 48 of second/specialist-implemented video conferencing apparatus 24 stores specialist video conferencing module 60 that is configured to implement the display 52, the video camera 54, the speaker 56 and the microphone 58 to conduct a video (and audio) communication session (i.e., a video chat session) with a customer 22 that is located at the first video conferencing apparatus 20.

In accordance with embodiments of the present invention, the specialist video conferencing module 60 includes a customer transferring routine 62 that is configured to provide the customer with seamless transfer between specialists during an ongoing video conference communication session. It should be noted that while the customer transferring routine 62 is shown and described as being embodied in the specialist video conferencing module 60 at least a portion of the customer transferring routine 62 may also be embodied in the customer video conferencing module 44 and/or stored/executed at a network-based server. In the illustrated example of FIG. 1, the customer 22 is participating in a two-way video conferencing communication session with a first specialist 26 and requires seamless transfer to a second specialist 28.

Referring to FIG. 2, a block diagram is presented of a second/specialist-implemented video conferencing apparatus 24 configured for seamless customer transfer from one specialist to another specialist during an ongoing video conference communication session, in accordance with embodiments of the present invention. As described in relation to FIG. 1, video conferencing apparatus 24 includes computing platform 46 having a memory 48 and a processor 50 in communication with memory 48. In addition, video conferencing apparatus 46 includes a display 52, a video camera 54, a speaker 56 and a microphone 58, all of which are in communication with the processor 50 and may be embodied in hardware and/or software. The memory 48 of video conferencing apparatus 24 stores specialist video conferencing module 60 that is configured to implement the display 52, the video camera 54, the speaker 56 and the microphone 58 to conduct a video conferencing communication session 64 (i.e., a video chat session) with a customer 22 that is located at the first video conferencing apparatus 20 (shown in FIG. 1). The specialist video conferencing module 60 includes a customer transferring routine 62 that is configured to provide the customer with seamless transfer between specialists during an ongoing video conferencing communication session 64.

In response to (1) receiving, during an ongoing video conferencing communication session 64 between a customer 22 and a first specialist 26, an indication of a need (or a request) to transfer 66 the customer to another specialist (i.e., one or more specialists, such as second specialist 28 or the like) and (2) communicating customer information 68 to the second specialist 28, the customer transferring module routine 62 is configured to provide a seamless transition mode 70 during the ongoing video conferencing communication session 64 that allows for simultaneous communication 72 between the customer 22, the first specialist 26 and the second specialist during the period in which the first specialist 26 hands-off the video conferencing communication session 64 to the second specialist 28 (i.e., the first specialist 26 drops-off of or departs from the video conferencing communication session 64).

The indication of a need to transfer 66 may be an input provided by either the first specialist 26 or the customer 22 and may include the type of specialist requested. For example, in a financial institution-based video conferencing system, a customer may be communicating with a mortgage/home loans specialist and during the course of the communication the specialist (or the customer) may perceive a need for the customer to communicate with a different type of specialist, (e.g., a financial advisor/wealth management advisor). The indication of the need to transfer 66 may result in identifying the second specialist 28, providing a listing of currently available second specialists 28 from which the first specialist 28 (or customer 22) may choose the appropriate second specialist 28 or trigger queuing of the second specialist 28 (such that the next available second specialist of the type requested is the transferee specialist for the ongoing video conferencing communication session 64).

Communicating customer information 68 to the second specialist 28 prior to the seamless transition mode 70 may be necessary to insure more efficiency during the transition mode 70. The second specialist 28 can either review the customer information 68 prior to joining the transition mode 70 and/or rely on the customer information 68 during the transition mode 70 and thereafter. In specific embodiments, the customer information 68, which may be historical customer information stored in the customer's profile and/or may be dynamic information obtained by the first specialist 26 during the ongoing video conferencing communication session 64, may be communicated electronically or electronically accessible to the second specialist 28. In such embodiments, as described in more detail in relation to FIG. 3, in the event the second specialist 28 is of a type that can only receive, without explicit customer consent, specific information related to the customer, the customer transferring routine 62 may include a rules engine to determine what specific information can be communicated to the second specialist absent the explicit customer consent. In alternate embodiments of the invention, in which the first specialist 26 places the customer 22 on hold while contacting an appropriate second specialist 28, the first specialist 26 may, in addition to or in lieu of electronic communication, manually communicate the customer information 68 to the second specialist 28.

Moreover, the customer transferring routine 62 is configured to seamlessly transfer the video conferencing communication session 64 from (1) communication between first specialist 26 and the customer 22 to (2) to the transition mode 70 which includes simultaneous communication between the first specialist 26, the customer 22 and the second specialist 28. In embodiments in which the media format is video, simultaneous communication may include a dual screen display of two or more of the transition mode 70 participants. For example, the customer may be presented with a dual screen display of a live video stream of the first specialist and a live stream of the second specialist (or live video streams of multiple second specialists, if such is warranted), while the first specialist 26 is presented with dual screen display of a live video stream of the customer and a live video stream(s) of the other specialist(s). The transition mode 70 serves to create an environment for the first specialist 28 to introduce the customer 22 to the second specialist 28, as well as, a forum for the first specialist 26 to communicate the context of the transfer or other customer-related information to the second specialist 28 in the "presence" of the customer 22.

Referring to FIG. 3, a block diagram is presented of a second/specialist-implemented video conferencing apparatus 24 configured for seamless customer transfer from one specialist to another specialist during an ongoing video conferencing communication session, in accordance with embodiments of the present invention. The video conferencing apparatus 24 which may include more than one physical device or unit is operable to receive and execute modules, routines and applications, such as specialist video conferencing module 60 and the subcomponent customer transferring routine 62 and the like.

The video conferencing apparatus 24 includes a computing platform that can receive and execute routines and applications. The computing platform includes memory 48, which may comprise volatile and nonvolatile memory such as read-only and/or random-access memory (RAM and ROM), EPROM, EEPROM, flash cards, or any memory common to computer platforms. Further, memory 48 may include one or more flash memory cells, or may be any secondary or tertiary storage device, such as magnetic media, optical media, tape, or soft or hard disk.

Further, the computing platform also includes at least one processor 50, which may be an application-specific integrated circuit ("ASIC"), or other chipset, processor, logic circuit, or other data processing device. Processor 50 or other processor such as ASIC may execute an application programming interface ("API") layer (not shown in FIG. 3) that interfaces with any resident programs, such as video conferencing module 60 and the subcomponent customer transferring routine 62 and the like, stored in the memory 48 of video conferencing apparatus 24. Processor 50 includes various processing subsystems (not shown in FIG. 3) embodied in hardware, firmware, software, and combinations thereof, that enable the functionality of video conferencing apparatus 24 and the operability of the apparatus on a network. For example, processing subsystems allow for initiating and maintaining communications, and exchanging data, with other networked devices. Additionally, processing subsystems may include any portion of the functionality of video conferencing module 60 obviating the need for such applications and modules to be stored in the memory.

As previously noted in relation to FIGS. 1 and 2, video conferencing apparatus 24 includes display 52, video camera/image capturing device 54, speaker 56 and microphone 58, which are all in communication with processor 50.

The memory 48 of video conferencing apparatus 24 stores specialist video conferencing module 60 that is configured to implement the display 52, the video camera 54, the speaker 56 and the microphone 58 to conduct a video conferencing communication session 64 (i.e., a video chat session) with a customer 22 that is located at a video conferencing apparatus (video conferencing apparatus 20 of FIG. 1). The specialist video conferencing module 60 includes a customer transferring routine 62 that is configured to provide the customer with seamless transfer between specialists during an ongoing video conferencing communication session 64.

In specific embodiments, the customer transferring routine 62 is configured to receive, during the ongoing video conferencing communication session 64 between the customer 22 and the first specialist 26, an indication of a need to transfer 66 the communication to a second specialist 66. It should be noted that a second specialist may include more than one specialist (e.g., different types of specialties) in those instances in which more than one specialist is needed or required by the customer. As previously noted the indication may comprise an input provided by either the first specialist 26 or the customer 22 and may include the type of specialist requested. In certain embodiments, the customer transfer routine 62 may be configured to allow the customer to initiate a transfer to another specialist of the same type in the event the customer 22 is experiencing communication problems (i.e., technical problems or the like) with the first specialist 26 or believes that they would be better serviced by another specialist. In other specific embodiments, the first specialist 26, through communications with the customer 22, may perceive the need for a different type of specialist and, in response to asking and confirming that the customer desires a transfer to another specialist at the conclusion of their discussions, provides the request input indicating the need for the transfer.

As previously discussed in relation to FIG. 2, the indication of the need to transfer 66 may result in any one of (a) identifying the second specialist 28, (b) providing a listing of currently available second specialist 28 from which the first specialist 28 (or customer 22) may choose the appropriate second specialist 28 and/or (c) trigger queuing of the second specialist 28 (such that the next available specialist of the type requested is the transferee/second specialist 28 for the ongoing video conferencing communication session 64. Queuing of the second specialist 28 may insure that the second specialist 28 is on-hand, waiting to join the transition mode 70 when the customer 22 and the first specialist 26 are ready to move into the transition mode 70. In other embodiments of the invention, the customer transferring routine 64 may be configured to alert the first specialist (and/or customer 22) when the second specialist has been identified and/or when the second specialist is ready to enter the transition mode 70. Identification of the second specialist is necessary in order to subsequently communicate customer information 68 to the second specialist 28 prior to the transition mode 70.

In addition, customer transferring routine 62 may be configured to electronically communicate customer information 68 to the second specialist 28 prior to the seamless transition mode 70. Such communication of customer information prior to the transition mode may be necessary to insure more efficiency during the transition mode 70 (i.e., the first specialist or the customer does not have to communicate rudimentary information and/or information communicated to the second specialist during the initial (pre-transition mode) portion of the video conferencing communication session 64). In this regard, the second specialist 28 can either review the customer information 68 prior to joining the transition mode 70 and/or rely on the customer information 68 during the transition mode 70 and thereafter. In specific embodiments, the customer information 68 may be historical customer information stored in the customer's profile and/or may be dynamic information obtained by the first specialist 26 during the ongoing video conferencing communication session 64.

The customer transferring routine 62 may be configured to include customer information exchange rules engine 74 that applies business rules 76 to determine what customer information 68 can (and cannot) be communicated to the second specialist 28, absent consent from the customer 22. The business rules 76 may be unique to different line-of-businesses or other entities within the business implementing the video conferencing system and may be based on the customer information 78 that is accessible or obtained by the first specialist 26 and/or the type 80 of the second specialist. For example, in the financial institution business setting, only certain information, as designated by privacy laws and/or the financial institution, may be communicated to a financial advisor/wealth management type specialist, absent consent by the customer. In this regard, the rules engine 74 acts as a filter to ensure that only compliant customer information is communicated to the second specialist prior to the transition mode 70. In other embodiments of the invention, the customer transferring routine 62 may be configured to include a customer information exchange option 82, which is presented to the customer 22 in response to receiving an indication 66 that a transfer is necessary and, which based on customer input 84 that acquiesces to the communication of the customer information 68, results in the communication of the customer information 68 to the second specialist 28. The customer information exchange option 82 may include all necessary disclosures which need to be communicated to the customer 22 for the purpose of effectuating the communication of the customer information 68 to the second specialist 28. It should be noted that in certain instances, all information pertaining to the customer (i.e., historical profile information or information obtained during the video conferencing communication session) may be communicated to the second specialist, without subjecting the information to the rules engine 74 or otherwise obtaining the customer's consent.

In alternate embodiments, not shown in FIG. 3 but described in detail in relation to FIGS. 4 and 5, the video conferencing module 60 may include an electronic media format determination routine configured to determine the electronic media format for the communication between the second specialist and the customer based on business rules and/or the media capabilities of the second specialist. In certain instances, the second specialist may only be capable of communicating via voice and/or text chat, while in other instances, the business, for economic reasons or the like, may prefer to implement voice-only conferencing or text chat (as opposed to video communication).

As previously noted in relation to FIG. 2, the customer transferring routine 62 is configured to seamlessly transfer the video conferencing communication session from (1) communication between first specialist 26 and the customer 22 to (2) the transition mode 70 which includes simultaneous communication between the first specialist 26, the customer 22 and the second specialist 28. In embodiments in which the electronic media format is two-way video conferencing, simultaneous communication may include a dual screen simultaneous display 86 of two or more of the transition mode 70 participants. For example, the customer may be presented with a dual screen display of a live video stream of the first specialist and a live stream of the second specialist (or live video streams of multiple second specialists, if such is warranted), while the specialist is presented with dual screen display of a live video stream of the customer and a live video stream(s) of the other specialist(s). The transition mode 70 serves to create an environment for the first specialist 28 to introduce the customer 22 to the second specialist 28, as well as, a forum for the first specialist 26 to communicate the context of the transfer or other customer-related information to the second specialist 28 in the "presence" of the customer 22.

Determining Electronic Media Format when Transferring a Customer Between Specialists or Amongst Communication Sources at a Customer Service Outlet Referring to FIG. 4, a block diagram is presented of an apparatus 100 configured for determining electronic media format when seamlessly transferring/transitioning a customer from one media-based communication session to another media-based communication session, in accordance with embodiments of the present invention. Apparatus 100 includes computing platform 102 having a memory 104 and a processor 106 in communication with memory 104. In addition, apparatus 124 may, in some embodiments, include a display 108, a video camera 110, a speaker 112 and a microphone 114, all of which are in communication with the processor 150 and may be embodied in hardware and/or software. The memory 104 of apparatus 100 stores communication module 116 that is configured to implement one or more of the display 108, the video camera 110, the speaker 112 and the microphone 114 to conduct a communication session 118 (i.e., a two-way video conference session, a one-way video conference session, an audio session, a text chat session or the like) with a customer 22. The communication module 116 includes a customer transfer routine 120 that is configured to provide the customer with seamless transfer between specialists and/or communication sources during an ongoing communication session 118.

The customer transferring routine 120 is configured to receive, during an ongoing communication session 118, a request to transfer 122 the customer to another specialist and/or, another communication source/platform or the like. The request to transfer 166 may be an input provided by either the customer 22, the specialist 26 communicating with the customer or the application/platform and may include the type of specialist and/or platform/application requested. For example, in a financial institution-based video conference system, a customer may be communicating with a mortgage/home loans specialist and during the course of the communication the specialist (or the customer) may perceive a need for the customer to communicate with a different type of specialist, (e.g., a financial advisor/wealth management advisor). The request to transfer 122 may result in identifying the second specialist 28, providing a listing of currently available second specialists 28 from which the first specialist 26 (or customer 22) may choose, or trigger queuing of the second specialist 28 (such that the next available second specialist of the type requested is the transferee specialist for the ongoing communication session 26.

In response to receiving the request to transfer 122, the customer transferring routine 120 is further configured to perform an electronic media format determination 124 to determine an electronic media format 194 to implement upon transfer (e.g., for communication between the second specialist 28 and the customer 22 or, in a self-service capacity, communication between an online/network content/presentation and the customer 22) based on application of at least one business rule 126. The electronic media format 128 may be two-way video conference, one-way video conference (customer receives video and audio feed and specialist only receives audio feed) audio-only conferencing, text chat, visual-only media, such as online/network content, application/presentation or any other conceivable media format used for communication. It should be noted that determination of the electronic media format may be based on the capabilities of the second specialist and/or the configuration of the online/network content, application/presentation. For example, in certain instances, specialists of a certain type may only be configured to communicate via audio, in which case, if the requested specialist is of that type, the media format is limited to audio-only. In other examples if the requested business knowledge source is online/network content or a presentation/application, the media format may be limited to a visual-only presentation.

Moreover, in specific embodiments in which the transfer of communication sessions is between specialists within a video conference communication session, the customer transferring routine 120 may be configured to seamlessly transfer 130 the video conferencing communication session from (1) communication between first specialist 26 and the customer 22 to (2) to communication between the first specialist 26, the customer 22 and the second specialist 28 implementing the determined electronic media format 128. In such embodiments, seamless transfer 130 may include simultaneous communication between the first specialist 26, the customer 22 and the second specialist 28. Thus, for example, if the determined electronic media format is audio conference-only, the second specialist may join an ongoing video conferencing communication session via audio-only, while the first specialist 26 and the customer 22 are communicating via video and, once the first specialist 26 hands-off the session to the second specialist 28, the remainder of the communication session concludes in audio-only conference communication. In the same regard, if the determined electronic media format is text-chat, the second specialist 28 may join the communication session via text-chat, while the first specialist 26 and the customer 22 are communicating via video. The portion of simultaneous communication allows for the first specialist 26 to instruct the customer 22 as to how to conduct the text-chat, if need be. Once the first specialist 26 hands-off the session to the second specialist 28, the remainder of the communication session concludes in text-chat only communication.

Referring to FIG. 5, a block diagram is presented of an apparatus 100 configured for determining media format when seamlessly transferring a customer amongst business knowledge sources (specialists and/or communication sources) at a customer service outlet, in accordance with embodiments of the present invention. The apparatus 100 which may include more than one physical device or unit is operable to receive and execute modules, routines and applications, such as communication module 116 and the subcomponent customer transferring routine 120 and the like.

The apparatus 100 includes a computing platform 102 that can receive and execute routines and applications. The computing platform includes memory 104, which may comprise volatile and nonvolatile memory such as read-only and/or random-access memory (RAM and ROM), EPROM, EEPROM, flash cards, or any memory common to computer platforms. Further, memory 104 may include one or more flash memory cells, or may be any secondary or tertiary storage device, such as magnetic media, optical media, tape, or soft or hard disk.

Further, the computing platform also includes at least one processor 106, which may be an application-specific integrated circuit ("ASIC"), or other chipset, processor, logic circuit, or other data processing device. Processor 106 or other processor such as ASIC may execute an application programming interface ("API") layer (not shown in FIG. 5) that interfaces with any resident programs, such as communication module 116 and the subcomponent customer transferring routine 120 and the like, stored in the memory 104 of apparatus 100. Processor 106 includes various processing subsystems (not shown in FIG. 5) embodied in hardware, firmware, software, and combinations thereof, that enable the functionality of apparatus 100 and the operability of the apparatus on a network. For example, processing subsystems allow for initiating and maintaining communications, and exchanging data, with other networked devices. Additionally, processing subsystems may include any portion of the functionality of communication module 116 obviating the need for such applications and modules to be stored in the memory.

As previously noted in relation to FIGS. 1-4, apparatus 100 includes one or more of display 108, video camera/image capturing device 110, speaker 112 and microphone 114, which are all in communication with processor 106.

The memory 104 of apparatus 100 stores communication module 116 that is configured to implement at least one of the display 108, the video camera 110, the speaker 112 and the microphone 114 to conduct a communication session 118 (e.g., a video chat session or the like) with a customer 22 that is located at a communication source (e.g., video conference apparatus 20 of FIG. 1). The communication module 116 includes a customer transferring routine 120 that is configured to provide the customer with seamless transfer between specialists during an ongoing communication session 118.

In specific embodiments, the customer transferring routine 120 is configured to receive, during the ongoing communication session 118 between the customer 22 and the first specialist 26, a request to transfer 122 the communication to a second specialist 28. It should be noted that a second specialist 28 may include more than one specialist (e.g., different types of specialties for each specialist) in those instances in which more than one specialist is needed or required by the customer. As previously noted the request 122 may comprise an input provided by either the first specialist 26 or the customer 22 and may include the type of specialist requested. In certain embodiments, the customer transfer routine 120 may be configured to allow the customer to initiate a transfer to another specialist of the same type in the event the customer 22 is experiencing communication problems (e.g., technical problems) with the first specialist 26 or believes that they would be better serviced by another specialist. In other specific embodiments, the first specialist 28, through communications with the customer 22, may perceive the need for a different type of specialist and, in response to asking and confirming that the customer desires a transfer to another specialist at the conclusion of their discussions, provides the request input indicating the need for the transfer.

As previously discussed in relation to FIG. 4, the request to transfer 122 may result in any one of (a) identifying the second specialist 28, (b) providing a listing of available second specialists 28 from which the first specialist 28 (or customer 22) may choose the appropriate second specialist 28 and/or (c) trigger queuing of the second specialist 28 (such that the next available specialist of the type requested is the transferee/second specialist 28 for the ongoing communication session 118. Queuing of the second specialist 28 may insure that the second specialist 28 is on-hand, waiting to join the transfer/transition mode 130 when the customer 22 and the first specialist 26 are ready to move into the transition mode 130. In other embodiments of the invention, the customer transferring routine 120 may be configured to alert the first specialist (and/or customer 22) when the second specialist has been identified and/or when the second specialist is ready to move to the seamless transfer mode 130 of communication. Identification of the second specialist may be necessary, in those embodiments of the invention that require communication of customer information to the second specialist 28 prior to the seamless transfer 130.

In response to receiving the request to transfer 122, the customer transferring routine 120 is further configured to determine an electronic media format 124 to implement upon transfer (i.e., for communication between the second specialist 28 and the customer 22) based on application on at least one business rule 126. The electronic media format may be two-way video conferencing, one-way video conferencing audio-only conferencing, text chat or any other conceivable media format used for communication. The business rule 126 may be based on customer status 132 such that a customer having a preferred (i.e., elevated) status may be provided video format, while a customer of a standard/non-preferred status may be provided a lesser media format, such as audio-only or text chat. In additional embodiments of the invention, the business rule 126 may be based on customer profile information 134. For example, the customer profile information 134 may indicate which media format the customer prefers or may provide information about an attribute that is paramount to media format determination (i.e., the customer has a preferred language or the customer has a disability, such as hearing impaired or the like). In other embodiments of the invention, the business rule 126 may be based on historical interactions/transactions 136 conducted with the customer. For example, the historical interactions 136 may indicate difficulty interacting with the customer or difficulty pleasing the customer, in such instances, the video format may be preferred to insure that the customer of provided the utmost attention and care.

In other embodiments of the invention, the business rule 126 applied to determine the media format 124 may be based on the reason for the transfer/type second specialist 138. For example, if the transfer is because the customer is unsatisfied with the current specialist or desires another specialist, the media format may be video to insure proper attention and care is given to the customer. In other embodiments, in which certain types of specialists (e.g., certain lines-of-business or the like) may be limited to communication via certain types of media, the type of the second specialist may dictate the determined media format.

In still further embodiments of the invention, the business rule 126 applied to determine the media format 124 may be based on the shortest queue time 140. In certain instances, in which the customer may be unwilling to wait for certain type of media format, the media format with the shortest wait time (i.e., queue) may be chosen or the queue time may be one factor in determining the media format. In other embodiments of the invention, the business rule 126 applied to determine the media format 124 may be based on media format availability 143. For example, network disruptions or the like may result in certain media formats being currently unavailable, in which cases other media formats may be determined to accommodate the need for a timely transfer.

In alternate embodiments, not shown in FIG. 5 but which are described in detail in relation to FIGS. 2 and 3, the communication module 116 may include a customer information exchange rules engine 74 that applies one or more business rules 76 to information related to the customer to determine what information is suitable to communicate to the second specialist prior to seamlessly transferring the communication session to the second specialist.

As noted in relation to FIG. 4, the customer transferring routine 120 is configured to seamlessly transfer 130 the communication session from (1) communication between first specialist 26 and the customer 22 to (2) to communication between the first specialist 26, the customer 22 and the second specialist 28 implementing the determined media format 128. In such embodiments, seamless transfer 130 may include simultaneous communication 144 between the first specialist 26, the customer 22 and the second specialist 28. Thus, for example, if the determined media format is audio-only, the second specialist will join the communication session 118 via audio-only, while the first specialist 26 and the customer 22 are communicating via video and, once the first specialist hands-off the session to second specialist, the remainder of the communication session 118 concludes in audio-only communication. In the same regard, if the determined media format 128 is text-chat, the second specialist 28 will join the communication session 118 via text-chat, while the first specialist 26 and the customer 22 are communicating via video.

Referring to FIG. 6, a flow diagram is presented of a method 200 for seamless customer transfer from one specialist to another specialist during an ongoing video conference communication session, in accordance with embodiments of the present invention. At Event 202, in response to receiving, during a video conference communication session conducted between a customer and a first specialist, an indication (or request) that the customer requires communication with a second specialist, electronically communicating, to the second specialist, customer information (e.g., customer profile information and/or information obtained from the customer during the current communication session). In specific embodiments, the indication that the customer requires communication may provide for receipt of an input from either the first specialist or the customer that is configured to request the transfer (communication with the second specialist). In such embodiments, the input, which may include the type of second specialist requested, may be configured to identify the second specialist, present a listing of second specialists currently available and/or place the customer in a queue for the second specialist.

In other specific embodiments of the method, communicating the customer information may include implementing a customer information exchange rules engine to determine what information can be passed along to the second specialist, absent customer consent. In other specific embodiments of the method, communicating the customer information may include providing the customer an information exchange option that allows the customer to consent to information exchange to the second specialist.

At Event 204, the video conference communication session is transitioned from communication between the customer and the first specialist to a transition mode that allows the first specialist, the second specialist and the customer to communicate simultaneously prior to the first specialist handing-off the communication session to the second specialist. In specific embodiments of the method such transitioning includes presenting a dual screen display to the customer, first specialist and second specialist that includes live video streams of the first specialist, the second specialist and the customer, such that, during the transition mode, the customer views live video streams of the first and second specialists and the first and second specialists view live video streams of the customer and the other specialist.

Referring to FIG. 7, a flow diagram is presented of a method 300 for determining media format for customer transfer from one specialist to another specialist during an ongoing communication session, in accordance with embodiments of the present invention. At Event 302, during a media-based communication session conducted between a customer and a first specialist, a request is received to transfer a customer from a first specialist to a second specialist. In specific embodiments, the request is an input from either the first specialist or the customer that is configured to request the transfer (communication with the second specialist). In such embodiments, the input, which may include the type of second specialist requested, may be configured to identify the second specialist, present a listing of second specialists currently available and/or place the customer in a queue for the second specialist.

At Event, 304 in response to receiving the request, a media format is determined which will be implemented for communication between the second specialist and the customer during the ongoing communication session. The determination of the media format is based on application of one or more business rules. The business rules may be based on the status of the customer at the business, customer profile/preferences information or customer information obtained during the current communication session. Moreover, the business rules may be based on historical interactions with the customer, the reason for the transfer and/or the type of second specialist requested. In additional embodiments of the invention, the business rules may take into account the shortest queue/wait time for a media format or the current availability of a media format.

At Event 306, the communication session is seamlessly transitioned from communication between the customer and the first specialist to a transition mode that allows the first specialist, the second specialist and the customer to communicate simultaneously prior to the first specialist handing-off the communication session to the second specialist. In specific embodiments of the method, in which the determined media format is video, such transitioning includes presenting a dual screen display to the customer, first specialist and second specialist that includes live video streams of the first specialist, second specialist and customer, such that, during the transition mode, the customer views live video streams of the first and second specialists and the first and second specialists view live video streams of the customer and the other specialist. In other embodiments of the invention, the simultaneous communication may provide for the first specialist and customer to continue communicating in video format while the customer, and in some embodiments, the first specialist communicate with the second specialist in the determined media format.

Automated Local Assistance to a Customer Using a Video Conferencing System at a Business Location According to further embodiments of the invention described herein, various systems, apparatus, methods, and computer program products are herein described for providing automated local assistance to customer currently using a video conference system. A request for assistance can be made during an ongoing video conference communication session by either the customer or the specialist. The request is configured to define the purpose of the request. The request is received by a customer assistance reply module that determines an entity responsible for replying to the request based on the purpose of the request and notifies the entity. For example, if the purpose of the request is for a notary, a notary is identified and is notified. However, if the request is for materials (e.g., paper and pens) to be brought into the video conferencing area/room, a generic associate/ customer service representative is identified and notified. In further embodiments of the invention, the customer assistance reply module is configured to implement an entity assistance queue which places the request in the queue such that a next-in-time available associate/customer service representative is assigned to the assistance request. The entity/ associate assigned to reply to the request may be notified of such via an alert that states the purpose of the request and may provide the location of the private setting where the video conference is occurring.

In this regard, by providing automated assistance during an ongoing video conference neither the customer nor the specialist needs to perform further actions to obtain the requested assistance. For example, the specialist does not have to place the customer on hold and contact the business location nor does the customer need to depart the video conference location and seek out assistance within the business location. As a result no interruption of the video conference occurs and the assistance appears at the video conference location with minimal to no intervention on behalf of the video conference participants.

Referring to FIG. 8, a combination schematic and block diagram is presented of a system 10 for providing automated customer assistance during an ongoing video conference at a customer service outlet, such as a banking center, in accordance with an embodiment of the invention. The system 10 includes a first or customer-implemented video conferencing apparatus 420 that is located within a private setting in a business location, such that the customer 422 can communicate and exchange private information with remote specialists. In one specific example, the first video conferencing apparatus 420 may be located within an enclosed office space at a financial institution, such as a banking center. The customer-implemented video conferencing apparatus 420 includes a computing platform 430 having a memory 432 and a processor 434 in communication with memory 432. In addition, video conferencing apparatus 420 includes a display 436, a video camera 438, a speaker 440 and a microphone 442, all of which are in communication with the processor 434 and may be embodied in hardware and/or software. The memory 432 of video conferencing apparatus 420 stores customer video conferencing module 444 that is configured to implement the display 436, the video camera 438, the speaker 440 and the microphone 442 to conduct a video conference communication session (i.e., a video chat session) with a specialist 426 that is located physically remote from the business location at which the video conferencing apparatus 420 is located. The customer video conferencing module 444 includes customer assistance request routine 462 that is configured to allow the customer to request local assistance during an ongoing video conference. Local assistance provides for entity within the business location to be notified of the assistance request and appear at the private setting during the video conference to provide the requested assistance.

The customer-implemented video conferencing apparatus 420 is in network 412 communication (wired, wireless or a combination thereof) with a second or specialist-implemented video conferencing apparatus 424. Video conferencing apparatus 24 may be any communication device that facilitates audio and video communication, such as personal computer (PC), laptop computer, mobile computing device (e.g., tablet device, mobile/cellular telephone) or the like. The specialist-implemented video conferencing apparatus 424 includes a computing platform 446 having a memory 448 and a processor 450 in communication with memory 448. In addition, video conferencing apparatus 424 includes a display 452, a video camera 454, a speaker 456 and a microphone 458, all of which are in communication with the processor 450 and may be embodied in hardware and/or software. The memory 448 of video conferencing apparatus 224 stores specialist video conferencing module 460 that is configured to implement the display 452, the video camera 454, the speaker 456 and the microphone 458 to conduct a video communication session (i.e., a video chat session) with the customer 422 that is located at the first video conference apparatus 420. The specialist video conferencing module 460 includes customer assistance request routine 462 that is configured to allow the specialist to request local assistance for the customer during an ongoing video conference, such that, an entity within the business location is notified of the assistance request and appears at the private setting during the video conference to provide the requested assistance to the customer.

Referring to FIG. 9, a dual block diagram is presented of a video conferencing apparatus 420/424 configured for requesting local assistance during an ongoing video conference and an on-site computing apparatus 468 configured to receive the local assistance request and identify the entity on-site for responding to the request, in accordance with embodiments of the present invention. As described in relation to FIG. 1, video conferencing apparatus 420/424 includes computing platform 430/446 having a memory 432/448 and a processor 434/450 in communication with memory 432/448. The memory 432/448 may comprise volatile and nonvolatile memory such as read-only and/or random-access memory (RAM and ROM), EPROM, EEPROM, flash cards, or any memory common to computer platforms. Further, memory 432/448 may include one or more flash memory cells, or may be any secondary or tertiary storage device, such as magnetic media, optical media, tape, or soft or hard disk. The processor 434/450 may be an application-specific integrated circuit ("ASIC"), or other chipset, processor, logic circuit, or other data processing device. Processor 434/450 or other processor such as ASIC may execute an application programming interface ("API") layer (not shown in FIG. 9) that interfaces with any resident programs, such as video conferencing module 60 and the subcomponent customer transferring routine 62 and the like, stored in the memory 48 of video conferencing apparatus 24. Processor 50 includes various processing subsystems (not shown in FIG. 3) embodied in hardware, firmware, software, and combinations thereof, that enable the functionality of video conferencing apparatus 420/42424 and the operability of the apparatus on a network. For example, processing subsystems allow for initiating and maintaining communications, and exchanging data, with other networked devices. Additionally, processing subsystems may include any portion of the functionality of video conferencing module 444/460 obviating the need for such applications and modules to be stored in the memory. In addition, video conferencing apparatus 420/424 includes a display 436/452, a video camera 438/454, a speaker 440/456 and a microphone 442/458, all of which are not shown in FIG. 9 and are in communication with the processor 434/450 and may be embodied in hardware and/or software.

The memory 432/448 of video conferencing apparatus 420/424 stores video conferencing module 444/460 that is configured to implement the display 436/452, the video camera 438/454, the speaker 440/456 and the microphone 442/458 to conduct a video conferencing communication session 464 (i.e., a video chat session) between a customer 422 that is located at a private setting within a business location and a specialist 426 located remote from the business location.

The video conference module 444/460 includes customer assistance request routine 462 that is configured to receive an assistance request input 466 from the customer or the specialist during an ongoing video conference communication session 464. In specific embodiments the user interface that displays the video feed of the customer to the specialist (or specialist to the customer) may include an activatable key for requesting local assistance. Additionally, as shown in FIG. 10, the assistance request 466 may include the specified purpose 480 for the assistance. In those embodiments that utilize the activatable key for requesting local assistance, activation of the key may provide for display of a dialog box or the like for the customer/specialist to input the specified purpose 480 or activation of the key may provide for display of specific purpose options, from which the customer or specialist may choose a specified purpose 480.

The on-site computing apparatus 468 includes computing platform 470 having a memory 472 and at least one processor 474 in communication with the memory. The memory 472 of on-site computing apparatus 468 includes customer assistance reply module 476 that is configured to receive the assistance request input 466 inputted by the customer 422 or the specialist 426 and identify an entity on-site (i.e., within the business location) 478 for responding to the assistance request.

Referring to FIG. 11, a block diagram is presented of an onsite computing apparatus 468 configured for receiving assistance requests from customers and specialists during ongoing video conferences, identifying entities for responding to the requests and notifying the identified entities, in accordance with embodiments of the present invention. The apparatus 468 which may include more than one physical device or unit may be physically located at the business location or may be in networked communication with the business location and is operable to receive and execute modules, routines and applications, such as customer assistance reply module 476 and the subcomponent entity notification routine 484 and the like.

The apparatus 468 includes a computing platform 470 that can receive and execute routines and applications. The computing platform includes memory 472, which may comprise volatile and nonvolatile memory such as read-only and/or random-access memory (RAM and ROM), EPROM, EEPROM, flash cards, or any memory common to computer platforms. Further, memory 472 may include one or more flash memory cells, or may be any secondary or tertiary storage device, such as magnetic media, optical media, tape, or soft or hard disk.

Further, the computing platform 470 also includes at least one processor 474, which may be an application-specific integrated circuit ("ASIC"), or other chipset, processor, logic circuit, or other data processing device. Processor 474 or other processor such as ASIC may execute an application programming interface ("API") layer (not shown in FIG. 11) that interfaces with any resident programs, such as customer assistance reply module 476 and the subcomponent entity notification routine 484 and the like, stored in the memory 472 of apparatus 468. Processor 474 includes various processing subsystems (not shown in FIG. 11) embodied in hardware, firmware, software, and combinations thereof, that enable the functionality of apparatus 468 and the operability of the apparatus on a network. For example, processing subsystems allow for initiating and maintaining communications, and exchanging data, with other networked devices. Additionally, processing subsystems may include any portion of the functionality of customer assistance reply module 476 obviating the need for such applications and modules to be stored in the memory.

The memory 472 of apparatus 468 stores customer assistance reply module 476 that is configured to receive the assistance request input 466 inputted by the customer 422 or the specialist 466 and identify the entity responsible for responding to the request 478 based on the specified purpose 480 included within the assistance request input 466. For example, if the assistance request is a general request with no specified purpose 480 or specified purpose is associate/customer service representative-generic (i.e., a request for printed materials, documents, supplies or the like) the module 476 will realize that any available associate/customer service representative may be the entity for responding to the request 78. In other embodiments, the specified purpose 480 may be for a specific function, such as a notary, which only certain specific associates/customer service representatives may qualify to perform the function.

In other embodiments of the invention, the customer assistance reply module 476 may implement an entity availability queue 482 which places the assistance request 466 in the queue such that the next-in-time available associate/customer service representatives is identified or otherwise assigned as the responsible entity for replying to the assistance request. In those embodiments of the invention, in which the assistance requests includes a specified purpose 480 the entity availability queue 482 may be specific to the specified purpose (e.g., a notary queue, or the like) such that the next-in-time available associate/customer service representatives that meets the specified purpose is identified or otherwise assigned as the responsible entity for replying to the assistance request. In other embodiments of the invention, associate's/customer service representative's workload/business is taken into account in identifying which associate/customer service representative to assign to an assistance request. For example, if the assistance request may result in further business (as determined by the specified purpose 480) the associate/customer service representative assigned to provide the assistance may be an associate/customer service representative with minimal business over a predetermined time period (e.g., day, week, month or the like).

The customer assistance reply module 476 may further include an entity notification routine 484 that is configured to notify the entity 478 identify as responsible for responding to the assistance request. In this regard, the entity notification routine 484 may be configured to generate and initiate electronic communication of an alert 486 that notifies an associate/customer service representative of the need to respond and may include, the specified purpose 480 of the assistance request, customer identity 488 and other relative customer information 488 (e.g., as obtained from a customer profile, inputted by the specialist or customer with the request or the like). In addition, the alert 486 may include the location 490 of the video conference, in the event the location provides for more than one video conference location. The alert may take the form of an Instant Message (IM) displayed on a work station of the associate/customer service representative, a text message to a mobile communication device, a voice message to a mobile communication device or the like. Moreover, the entity notification routine 484 may be configured such that if the entity 478 identified as responsible for responding to the assistance request does not acknowledge the alert (acquiescing in respond to the assistance request) within a predetermined period of time, the customer assistance reply module 476 will identify a next available associate/customer service representative for responding to the assistance request, and generate and initiate communication of an alert 486 to the next available associate/customer service representative.

Referring to FIG. 12, a flow diagram is presented of a method 500 for providing local assistance to a customer during an ongoing video conference, in accordance with embodiments of the present invention, At Event 502, an assistance request input is received during a remote video conference session conducted between a customer, located in a private setting of a business location, and a specialist, located remote from the business location. The assistance request input, which may be inputted by the customer or the specialist, is configured to request assistance from within the business location. The assistance request input may also include the specific purpose of the assistance request. For example, the specific purpose may be a general request for assistance from an associate/customer service representative or the specific purpose may be requesting another type of specialist, specific function (e.g., notary), specific supplies/materials or the like.

At Event 504, in response to processing the assistance request input, an entity is identified within the business location for responding to the assistance request. The entity may be an employee/associate of the business or a tangible item, such as computing devices, office supplies or the like. The identified entity (or someone in possession of the identified entity) responds to the request by entering the private setting where the video conference is occurring. The entity may be identified based on the specified purpose of the request or the entity may be identified based on availability and/or business activity. In specific embodiments an associate availability queue may be implemented to identify the next-in-time available associate that can respond to the assistance request. Moreover, the associate availability queue may be specific to the specified purpose of the request (e.g., only associated that have the requisite skill to perform the specified purpose of the request are placed in the queue).

In optional embodiments of the method, at Event 506, an alert is generated and communicated to the identified entity, which serves to notify the entity/associate of the need to respond to the assistance request. The alert may further include the identity of the customer, other relative information associated with the customer, the specific purpose of the request and the location of the private setting where the video conference is occurring.

Thus, systems, apparatus, methods, and computer program products described above provide for determining the electronic media format for transferring a customer between specialists and/or amongst different communication sources (i.e., applications or devices/mechanisms) within a customer service outlet, such as a banking center or the like. For example, while a two-way video conference system may be used for communication between a customer and a remote specialist, in certain instances in which the customer requires transfer to another specialist (e.g., a specialist having a different specialty) other media formats, such as one-way live video conference, live audio-only conference, text chat or the like may be implemented. Alternatively, in other instances in which the customer requires transition to a self-service application (e.g., an application that does not require live interaction with an associate/specialist) other media formats such as pre-recorded video or audio, online/network content/presentations may suffice, which may dictate a transfer in communication sources (i.e., transferring to an onsite tablet device, PC or the like). The need to determine a change in electronic media format upon transferring/transitioning between business knowledge sources may be based on media format availability and may take into account business rules that are based on cost effectiveness and the like. The business rules may take into account various factors, such as, but not limited to, the reason for the transfer (e.g., the type of specialist, the type of application required), the status of the customer, the profile/preferences of the customer, the historical interactions with the customer and the like. Additionally, other factors may influence the determination of the electronic media format, for example, the predicted duration of the transferred communication, the capabilities of the specialist or application, the current queue times and the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for selecting the electronic media format when transferring a user between knowledge sources, the system comprising:
    an apparatus including a computing platform having a memory and at least one processor in communication with the apparatus, wherein the apparatus further includes one or more of a display, a video camera, a speaker and a microphone, each of which is operatively in communication with the processor,
        wherein the apparatus is configured to implement one or more of the display, the video camera, the speaker and the microphone to provide a user a communication platform for conducting a communication session with a first specialist; and
    a user transferring module stored in a memory, executable by a processor and configured to (1) receive a request to transfer a user from the first specialist to a second specialist during the communication session, (2) in response to receiving the request, apply at least one business rule to determine a media format to implement for communication between the user and the second specialist, and (3) transfer the user from the first specialist to the second specialist using the determined media format.

2. The system of claim 1, wherein the user transferring module is further configured to apply the at least one business rule to determine the media format, wherein the business rule that is applied provides for choosing the media format based on one or more of business status of the user, user profile information or historical interactions with the user.

3. The system of claim 1, wherein the user transferring module is further configured to apply the at least one business rule to determine the media format, wherein the business rule that is applied provides for choosing the media format based on a specialty of the second specialist.

4. The system of claim 1, wherein the user transferring module is further configured to apply the at least one business rule to determine the media format, wherein the business rule that is applied provides for prioritizing selection of video communication as the media format based on availability of video communication from an entity associated with the second specialist.

5. The system of claim 1, wherein the user transferring module is further configured to apply the at least one business rule to determine the media format, wherein the business rule that is applied provides selecting the media format based on a shortest queue time for transferring to the second specialist.

6. The system of claim 1, wherein the user transferring module is further configured to apply the at least one business rule to determine the media format, wherein the media format is one of two-way video conference communication, one-way video conference communication, audio-only conference communication, and text chat communication.

7. The system of claim 1, wherein the user transferring module is further configured to initiate transfer of the user from the first specialist to the second specialist using the determined media format, wherein the determined format is video conference communication and the module is configured to present, in a transfer mode, a dual screen display of a first video stream of the first specialist and a second video stream of the second specialist.

* * * * *